(12) United States Patent
Wester

(10) Patent No.: US 12,215,813 B2
(45) Date of Patent: Feb. 4, 2025

(54) PLUMBING FITTING

(71) Applicant: Jayasiri Wester, Lower Hutt (NZ)

(72) Inventor: Jayasiri Wester, Lower Hutt (NZ)

(73) Assignee: Jayasiri Wester, Lower Hutt (NZ)

( * ) Notice: Subject to any disclaimer, the term of this patent is extended or adjusted under 35 U.S.C. 154(b) by 0 days.

(21) Appl. No.: 18/252,407

(22) PCT Filed: Oct. 22, 2021

(86) PCT No.: PCT/NZ2021/050187
§ 371 (c)(1),
(2) Date: May 10, 2023

(87) PCT Pub. No.: WO2022/103277
PCT Pub. Date: May 19, 2022

(65) Prior Publication Data
US 2023/0400134 A1     Dec. 14, 2023

(30) Foreign Application Priority Data

Nov. 11, 2020   (NZ) ........................................ 769856

(51) Int. Cl.
| | | |
|---|---|---|
| *F16L 37/098* | (2006.01) | |
| *F16L 37/133* | (2006.01) | |
| *F16L 37/138* | (2006.01) | |

(52) U.S. Cl.
CPC ......... *F16L 37/0985* (2013.01); *F16L 37/098* (2013.01); *F16L 37/133* (2013.01); *F16L 37/138* (2013.01)

(58) Field of Classification Search
CPC ... F16L 37/098; F16L 37/0985; F16L 37/133; F16L 37/1205; F16L 37/127
See application file for complete search history.

(56) References Cited

U.S. PATENT DOCUMENTS

| 5,176,406 A | 1/1993 | Straghan |
| 2007/0120362 A1* | 5/2007 | Poder .................. F16L 37/0985 |

(Continued)

FOREIGN PATENT DOCUMENTS

| AU | 2020200441 A1 | 2/2020 |
| CA | 3088753 A1 | 7/2019 |

(Continued)

OTHER PUBLICATIONS

Machine translation of Ep 2957809A1 (Year: 2015).*

(Continued)

*Primary Examiner* — Zachary T Dragicevich
(74) *Attorney, Agent, or Firm* — Alston & Bird LLP

(57) ABSTRACT

A plumbing fitting (100) has a cap (1) and a body (3). The body has a fitting end (5). Engagement projections (7, 9) extend radially outwardly from an outer circumferential surface of the fitting end (5). The cap has a first tab (13) and a second tab (15) with free ends. The tabs (13, 15) have receivers (23, 25) to receive the engagement projections (7, 9). The tabs permit flexure of each tab relative to the other. Each tab has a radially inwardly extending spacer member (27, 28, 29, 30) at the free end of the tab. As the fitting end is received by the cap, the free end of each tab is displaced radially outwardly to space apart an inner circumferential surface of the tabs from the outer circumferential surface of the fitting end, thereby providing clearance for receipt of the engagement projections (7, 9) by the receivers (23, 25).

18 Claims, 10 Drawing Sheets

(56) References Cited

U.S. PATENT DOCUMENTS

| | | | | |
|---|---|---|---|---|
| 2008/0129047 A1* | 6/2008 | Blivet | ................... | F16L 37/133 |
| 2011/0259447 A1 | 10/2011 | Ishizaka | | |
| 2021/0239248 A1* | 8/2021 | Watson | ................ | F16L 37/098 |
| 2022/0364664 A1* | 11/2022 | Kuhlhoff | ............... | F16L 37/091 |

FOREIGN PATENT DOCUMENTS

| | | | | | |
|---|---|---|---|---|---|
| CN | 109737260 A | | 5/2019 | | |
| CN | 111379915 A | | 7/2020 | | |
| EP | 1146275 B1 | | 6/2004 | | |
| EP | 2957809 A1 | * | 12/2015 | .............. | F16L 37/53 |
| GB | 2500061 A | | 9/2013 | | |
| GB | 2549510 A | * | 10/2017 | ............ | F16L 37/133 |
| WO | WO-2015/181294 A1 | | 12/2015 | | |

OTHER PUBLICATIONS

International Search Report and Written Opinion for International Application No. PCT/NZ2021/050187, dated Jan. 27, 2022, (12 pages), Australian Patent Office, Woden Act, Australia.

* cited by examiner

PLUMBING FITTING

CROSS REFERENCE TO RELATED APPLICATIONS

This application is a National Stage Application, filed under 35 U.S.C. § 371, of International Application No. PCT/NZ2021/050187, filed Oct. 22, 2021, which international application claims priority to and the benefit of New Zealand Application No. 769856, filed Nov. 11, 2020; the contents of both of which are hereby incorporated by reference in their entirety.

BACKGROUND

Related Field

This invention relates to a plumbing fitting.

Description of Related Art

Plumbing fittings are used to connect plumbing lines to one another or to other plumbing components and the like. Some plumbing fittings incorporate a releasable mechanism that allows a user to disconnect the fitting from a plumbing line or component. Other fittings may incorporate mechanisms which allow the fitting itself to be disassembled, or require the fitting itself to be disassembled to allow a connected plumbing line or component to be disconnected from the fitting.

In either case, these mechanisms often require complex assemblies with many moving parts. Further, these mechanisms may allow one to tamper with the fitting or connected components, making the fitting and connected components susceptible to damage or theft.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a plumbing fitting which is simple in construction and substantially tamper-proof, and/or to at least provide the public with a useful alternative.

BRIEF SUMMARY

In a first aspect of the invention, there is provided a plumbing fitting comprising: a cap; and a body comprising a fitting end that is configured to be received by the cap, the body comprising a first engagement projection and a second engagement projection that are circumferentially spaced apart from each other and that extend radially outwardly from an outer circumferential surface of the fitting end; wherein the cap comprises: a first tab and a second tab, each tab having a free end at a receiving end of the cap; the first tab comprising a first receiver that is configured to receive the first engagement projection and the second tab comprising a second receiver that is configured to receive the second engagement projection; wherein the tabs are configured to permit flexure of each tab relative to the other; and wherein each tab comprises a radially inwardly extending spacer member at the free end of the tab; wherein the spacer members are configured such that, as the fitting end is received by the cap, the free end of each of the tabs is displaced radially outwardly so as to space apart an inner circumferential surface of the tabs from the outer circumferential surface of the fitting end, thereby providing clearance for receipt of the engagement projections by the receivers.

In some embodiments, the fitting end comprises a spacer receiving section configured to receive the spacer members so as to permit the free end of each of the tabs to displace radially inwardly thereby bringing together the inner circumferential surface of the tabs with the outer circumferential surface of the fitting end.

In some embodiments, receipt of the engagement projections by the receivers together with receipt of the spacer members by the spacer receiving section together provide a substantially non-releasable coupling of the cap to the body.

In some embodiments, each receiver and respective engagement projection are together configured to substantially inhibit longitudinal translation and/or axial rotation of the cap relative to the body when the receiver receives the respective engagement projection.

In some embodiments, the spacer receiving section and the spacer members are together configured to substantially inhibit longitudinal translation and/or axial rotation of the cap relative to the body when the spacer members are received by the spacer receiving section.

In some embodiments, the body comprises at least one engagement ridge extending longitudinally along and radially outwardly from the outer circumferential surface of the fitting end and configured to engage between adjacent tabs.

In some embodiments, the at least one engagement ridge is configured to substantially inhibit axial rotation of the cap relative to the body when the at least one engagement ridge is engaged between the adjacent tabs.

In some embodiments, the spacer receiving section comprises at least one inward ledge extending radially inwardly from the outer circumferential surface of the fitting end.

In some embodiments, the spacer receiving section comprises a substantially annular engagement channel extending radially inwardly from the outer circumferential surface of the fitting end.

In some embodiments, the at least one engagement ridge is configured to engage in a slot between the adjacent tabs.

In some embodiments, the first receiver and second receiver each comprise a receiver aperture extending through a radial thickness of the first and second tabs respectively.

In some embodiments, the spacer members are circumferentially offset from the first and second receivers.

In some embodiments, the slot is circumferentially offset from the first and second receivers.

In some embodiments, the body comprises: a third engagement projection and a fourth engagement projection circumferentially spaced apart from the first and second engagement projections and extending radially outwardly from the outer circumferential surface of the fitting end; and wherein the cap comprises: a third tab and a fourth tab each having a free end at the receiving end of the cap; the third tab comprising a third receiver that is configured to receive the third engagement projection and the fourth tab comprising a fourth receiver that is configured to receive the fourth engagement projection; wherein the third tab and the fourth tab each comprise a radially inwardly extending spacer member at the free end of the third tab and fourth tab respectively.

In some embodiments, the body comprises a bore extending from the fitting end and longitudinally through the body and configured to receive a plumbing assembly and wherein the cap comprises a plumbing aperture configured to receive a plumbing line couplable to the plumbing assembly.

In some embodiments, receipt of the of the plumbing line by the plumbing aperture, coupling of the plumbing line to the plumbing assembly, receipt of the plumbing assembly by the bore and coupling of the cap to the body together provide a substantially fluidly-sealed connection of the plumbing line to the plumbing fitting.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both. The invention consists in the foregoing and also envisages constructions of which the following gives examples only.

BRIEF DESCRIPTION OF THE FIGURES

The present invention will now be described by way of example only and with reference to the accompanying drawings in which.

DETAILED DESCRIPTION OF VARIOUS EMBODIMENTS

Figure 1:
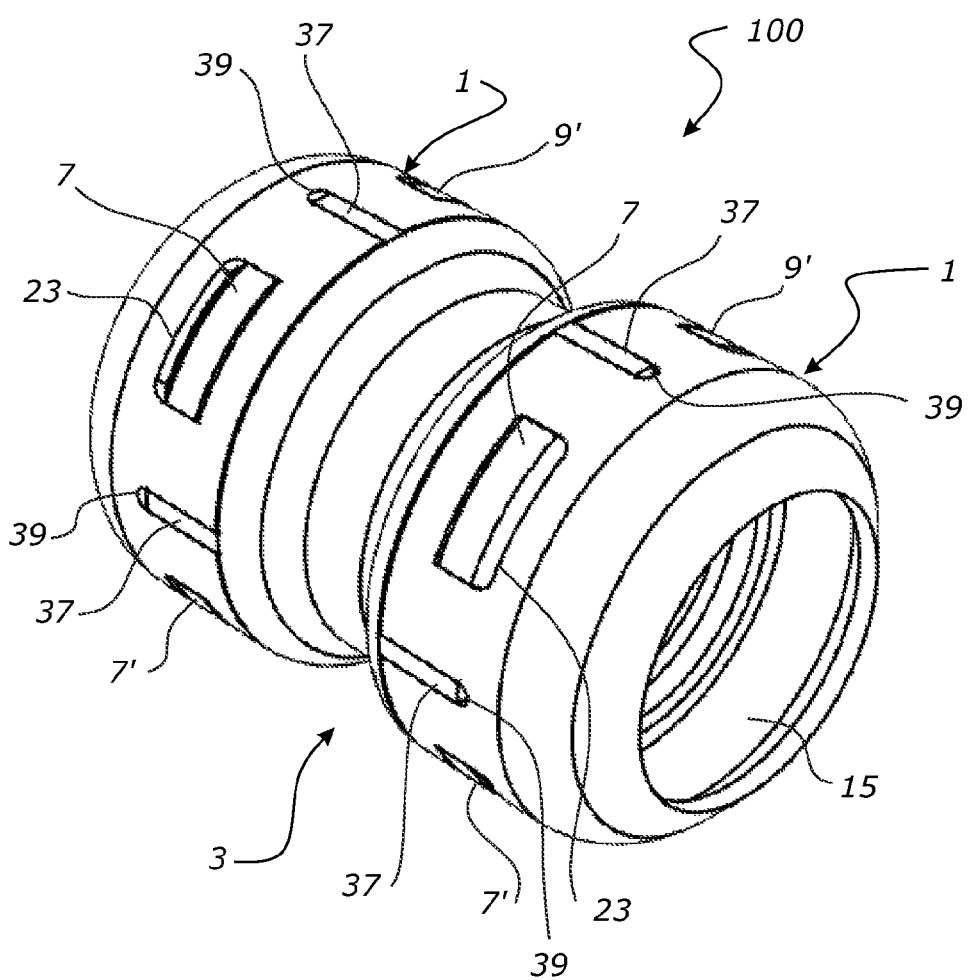
FIG. 1 shows a perspective view of an exemplary embodiment of the plumbing fitting in an assembled state.

FIG. 1 shows an illustrative embodiment of a plumbing fitting 100 in its assembled state. The plumbing fitting 100 may be used to provide fluid communication between plumbing lines, or plumbing features and devices such as valves, tanks, control systems and the like. Reference to a 'plumbing application' or 'plumbing system' in this specification may encompass any system that conveys fluids, such as, for example, a domestic or commercial heating and cooling system, a domestic or commercial hot or cold water system, an industrial waste removal system, an automotive coolant system, and any other fluid conveying system conceivable by one skilled in the art. Further, the plumbing fitting 100 providing fluid communication may encompass fluid comprising any liquid, any liquid/gas mixture, any gas, or any substantially liquid mixture containing solid particulates or the like.

The plumbing fitting 100 may optionally be formed from deformable materials such as plastics, or a range of metal or metal alloys, as described below, and can thus be configured to couple to plumbing lines or features comprising a range of materials, such as plastic hose lines, braided hoses, brass/copper hoses, as well as any other metallic or non-metallic plumbing feature or device.

The plumbing fitting 100 is shown with two caps 1 assembled on opposing ends of a single body 3. These opposing ends of the body 3 comprise fitting ends 5 to which the caps 1 can be coupled.

It should be noted that this body 3 shown in FIGS. 1-12 is only one example configuration of the body 3. The body 3 may instead comprise only one fitting end 5, with the other end of the body 3 forming part of a plumbing component such as a valve, or integrally formed with a wall or other structural feature through which a plumbing line 301 fitted to the plumbing fitting 100 passes. The body 3 may also instead comprise a tee-junction, or four-way junction, or any other suitable intermediate plumbing junction, having a plurality of fitting ends 5 for connecting a plurality of plumbing lines, as described in further detail below. The body may be substantially straight between the fitting ends 5 as shown in FIGS. 1-12, or alternatively could have one end angularly offset from the other end in an elbow configuration such as shown in FIG. 13 for example.

Therefore, while the illustrative embodiments of the plumbing fitting 100 shown in FIGS. 1-13 will be used throughout this specification to describe the principle functions and features of the plumbing fitting 100, various other embodiments of the plumbing fitting 100, and in particular adaptations and modifications to the cap 1 and body 3, may be contemplated by a person skilled in the art to suit different plumbing components and applications without departing from the scope of the invention.

The following embodiments of pluming fitting will be described with reference to one cap 1 and one fitting end 5. It will be appreciated in at least some embodiments the plumbing fitting will have a plurality of the fitting ends 5 and caps 1, and like reference numbers indicate like parts.

Figure 2:
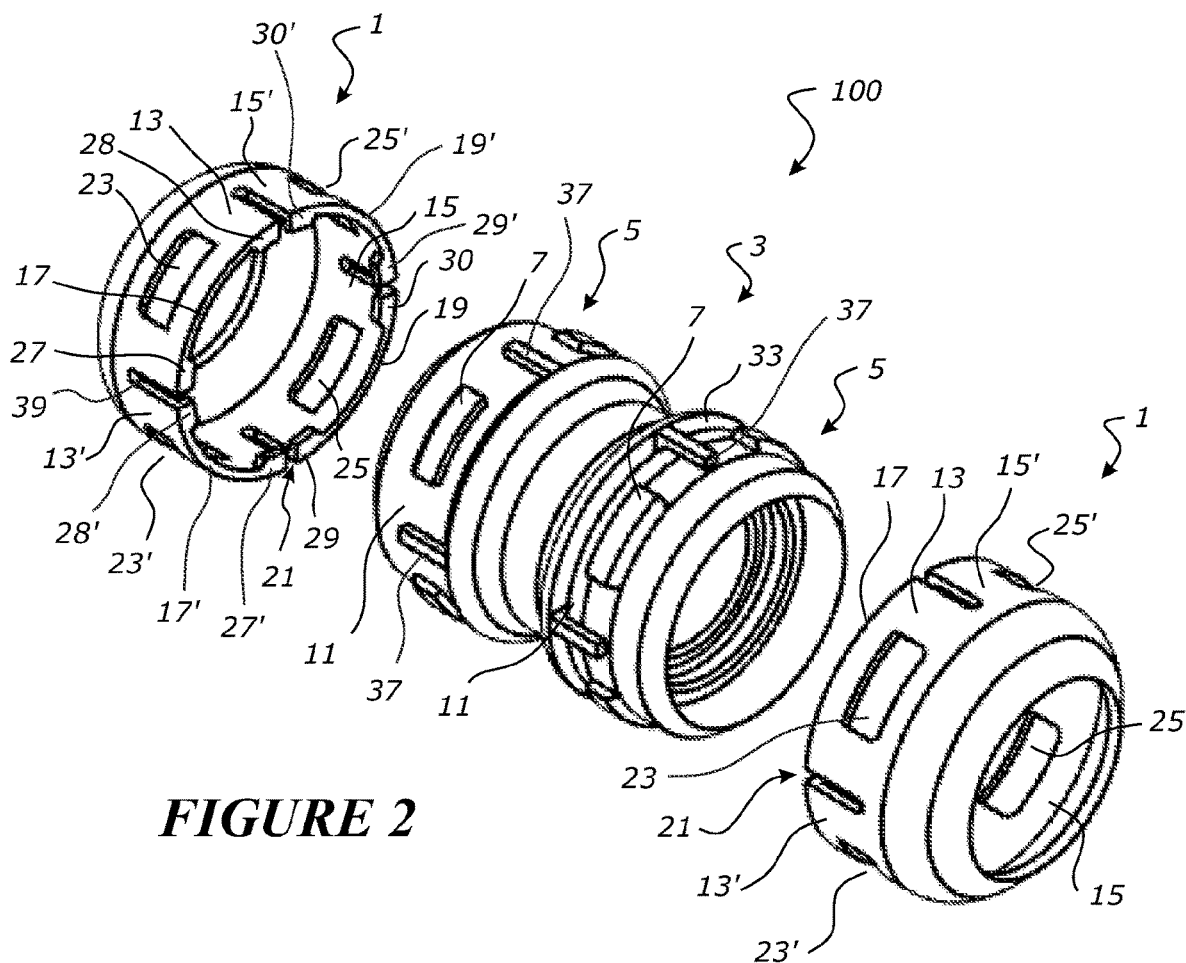
FIG. 2 shows a perspective view of the plumbing fitting of FIG. 1 in a disassembled state.
Figure 13:
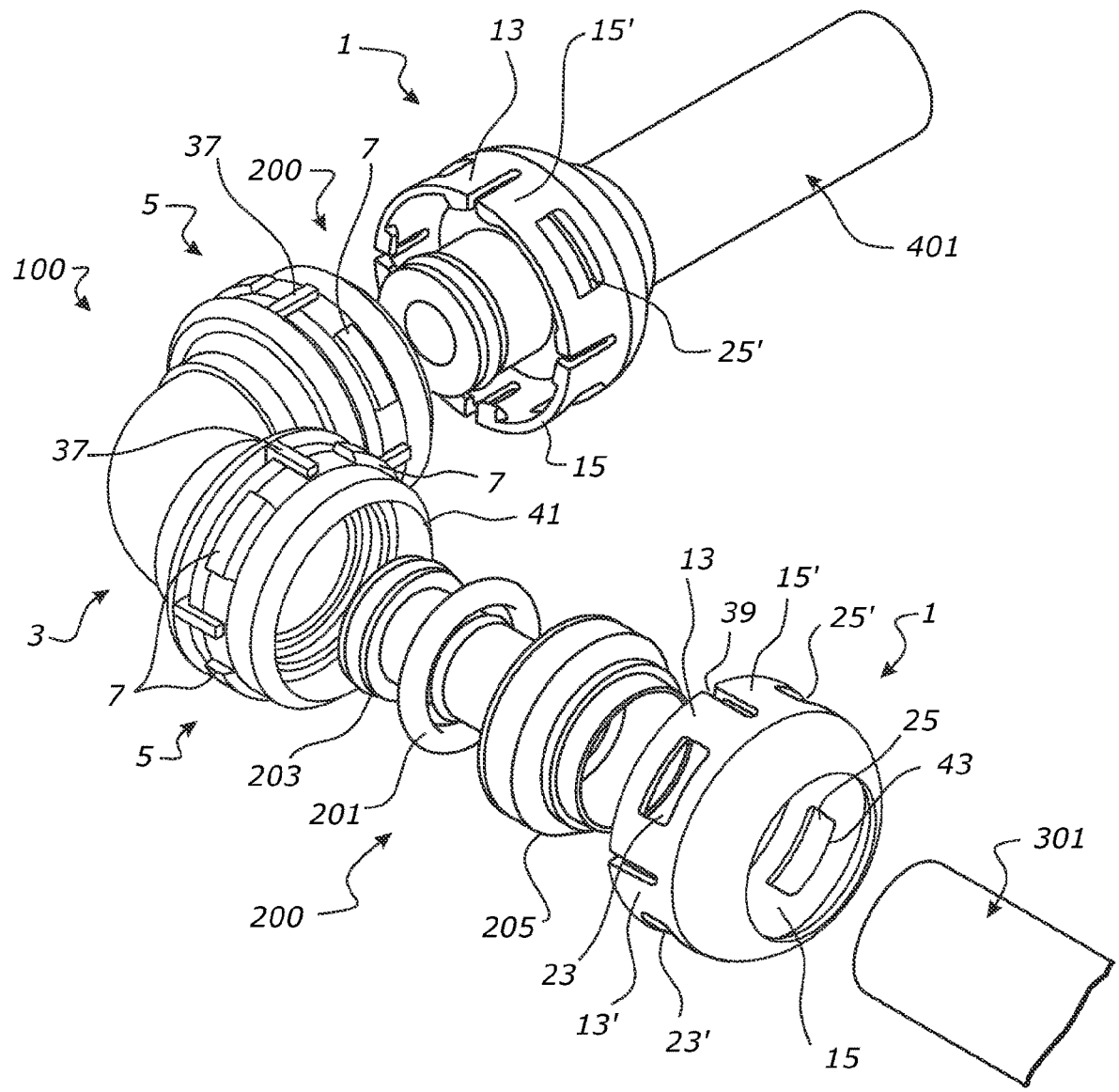
FIG. 13 shows an exploded perspective view of an exemplary embodiment of a plumbing fitting.

FIGS. 2 and 13 show the plumbing fittings 100 in a disassembled state. The plumbing fitting 100 comprises a cap 1 and a body 3. The body 3 comprises a fitting end 5 that is configured to be received by the cap 1. The body also comprises a first engagement projection 7 and a second engagement projection 9 (not visible in FIG. 2, but shown in FIG. 3) that are circumferentially spaced apart from each other, and that extend radially outwardly from an outer circumferential surface 11 of the fitting end 5.

The cap 1 comprises a first tab 13 and a second tab 15, each tab respectively having a free end 17, 19 at a receiving end 21 of the cap 1. The receiving end 21 of the cap 1 is substantially open so as to receive the fitting end 5 of the body 3. The first tab 13 comprises a first receiver 23 that is configured to receive the first engagement projection 7 and the second tab 15 comprises a second receiver 25 that is configured to receive the second engagement projection 9.

The body 3 shown in FIGS. 1-13 also comprises third and fourth engagement projections 7', 9', and the cap 1 shown in FIGS. 1-13 also comprises third and fourth tabs 13', 15' with corresponding receivers 23', 25'. The third engagement projection 7' and fourth engagement projection 9' are circumferentially spaced apart from the first and second engagement projections 7, 9 and also extend radially outwardly from the outer circumferential surface 11 of the fitting end 5. Further, the third tab and fourth tab 13', 15' each have a free end 17', 19' at the receiving end 21 of the cap 1, with the third tab 13' comprising a third receiver 23' that is configured to receive the third engagement projection 7' and the fourth tab 15' comprising a fourth receiver 25' that is configured to receive the fourth engagement projection 9'. The third tab 13' and the fourth tab 15' also each comprise a radially inwardly extending spacer member 27', 29' at the free end of the third tab 13' and fourth tab 15' respectively.

However, in some configurations, the cap 1 may comprise anywhere from two to eight, or even more tabs 13, 13', 15, 15' and corresponding receivers 23, 23', 25, 25', and the body 3 may likewise comprises anywhere from two to eight, or even more, corresponding engagement projections 7, 7', 9, 9'. This applies equally to many other components of the cap 1 and body 3 described in further detail below that correspond to, or are arranged on, those respective features. Therefore, any description of the functions and features of the first and second engagement projections, tabs, receivers, or other components/features corresponding to or arranged thereon, may apply equally to third, fourth, fifth etc. engagement projections, tabs, receivers, or other components/features corresponding to or arranged thereon, and the like. Like reference numbers indicate like parts with an addition of a prime (').

Therefore, while FIGS. 1-13 illustrate a 'four-tab' embodiment of the plumbing fitting 100, reference will be made predominately to the first and second of the respective engagement projections, tabs, receivers, and components/ features corresponding to or arranged thereon in this specification.

Figure 3:
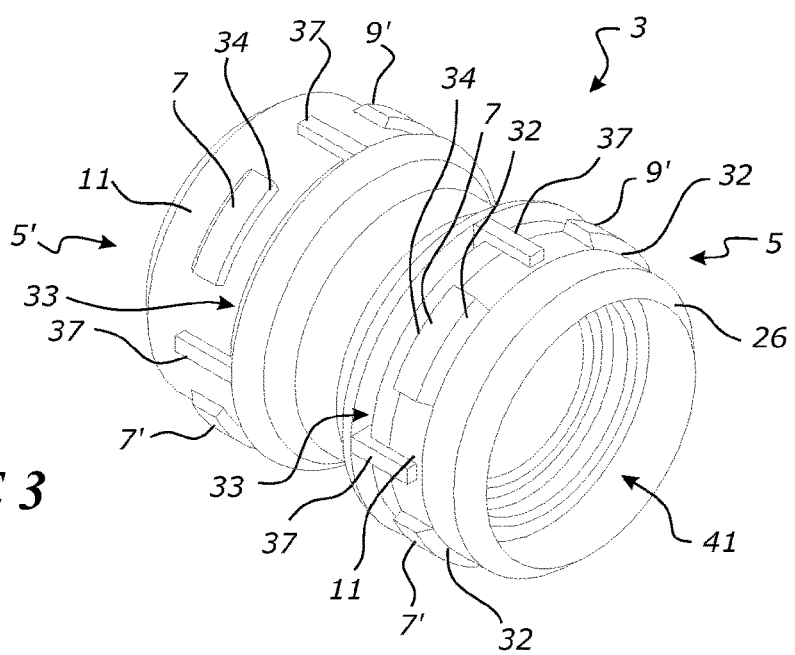
FIG. 3 shows a perspective view of the body of the plumbing fitting of FIG. 1.
Figure 4:
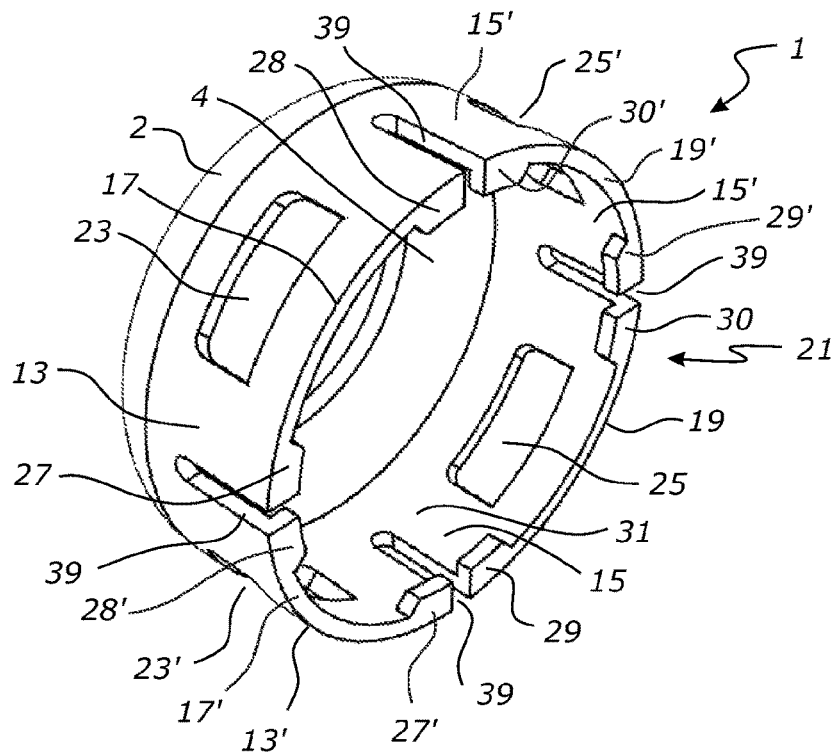
FIG. 4 shows a front overhead perspective view of the cap of the plumbing fitting of FIG. 1.
Figure 5:
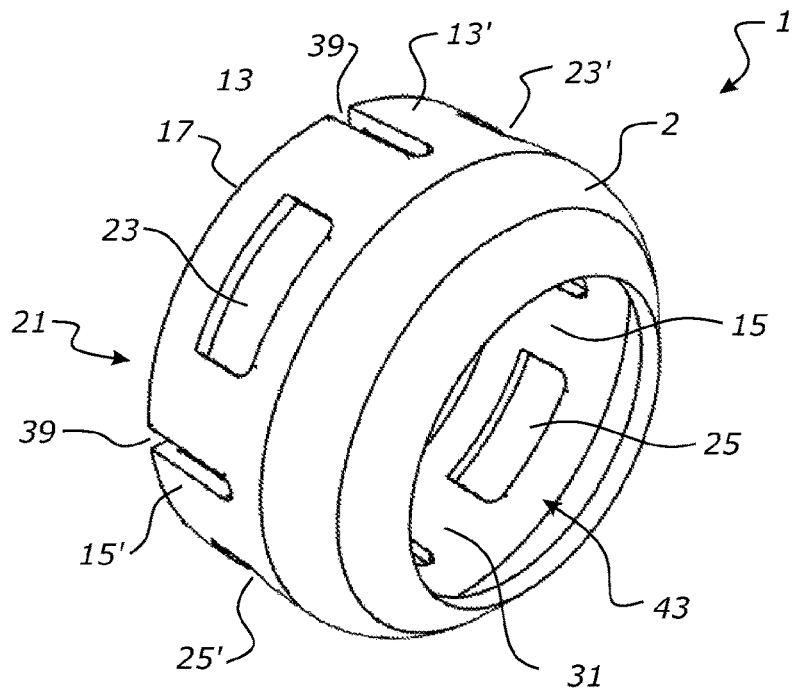
FIG. 5 shows a rear overhead perspective view of the cap of the plumbing fitting of FIG. 1.

FIGS. 4 and 5 show detailed views of the cap 1. The first and second tabs 13, 15 are configured to permit flexure of each tab relative to the other. In this way, each tab 13, of the cap 1 can move, flex, or deform relative to one another and relative to the substantially rigid cone end 2 of the cap 1. In particular, the free end 17 of the first tab 13 and the free end 19 of the second tab 15 (and the free ends 17', 19' of the any other tabs 13', 15'), can displace radially outwardly, and optionally radially inwardly, relative to their default circumferential positions shown in FIGS. 1-13. The features of the cap 1 that provide this functionality are described in further detail below.

Each tab 13, 15 also comprises a radially inwardly extending spacer member 27, 29 at the free end 17, 19 of the tab 13, 15. In the embodiment shown, the first tab 13 has two spacer members 27, 28 arranged on either lateral end of the first tab 13, and likewise, the second tab 15 has two spacer members 29, 30 arranged on either lateral end of the second tab 15. However, in some configurations, each tab may have only one spacer member, or any suitable plurality of spacer members extending from the free end of the tab. Reference made to the features and functions of the spacer members 27, 29 apply equally to spacer members 28, 30.

Each tab 13', 15' also has at least one radially inwardly extending spacer member 27', 29' at the free end 17', 19' of the tab 13', 15'. The variants for the spacer member(s) is/are as outlined in the preceding paragraph.

Figure 6:
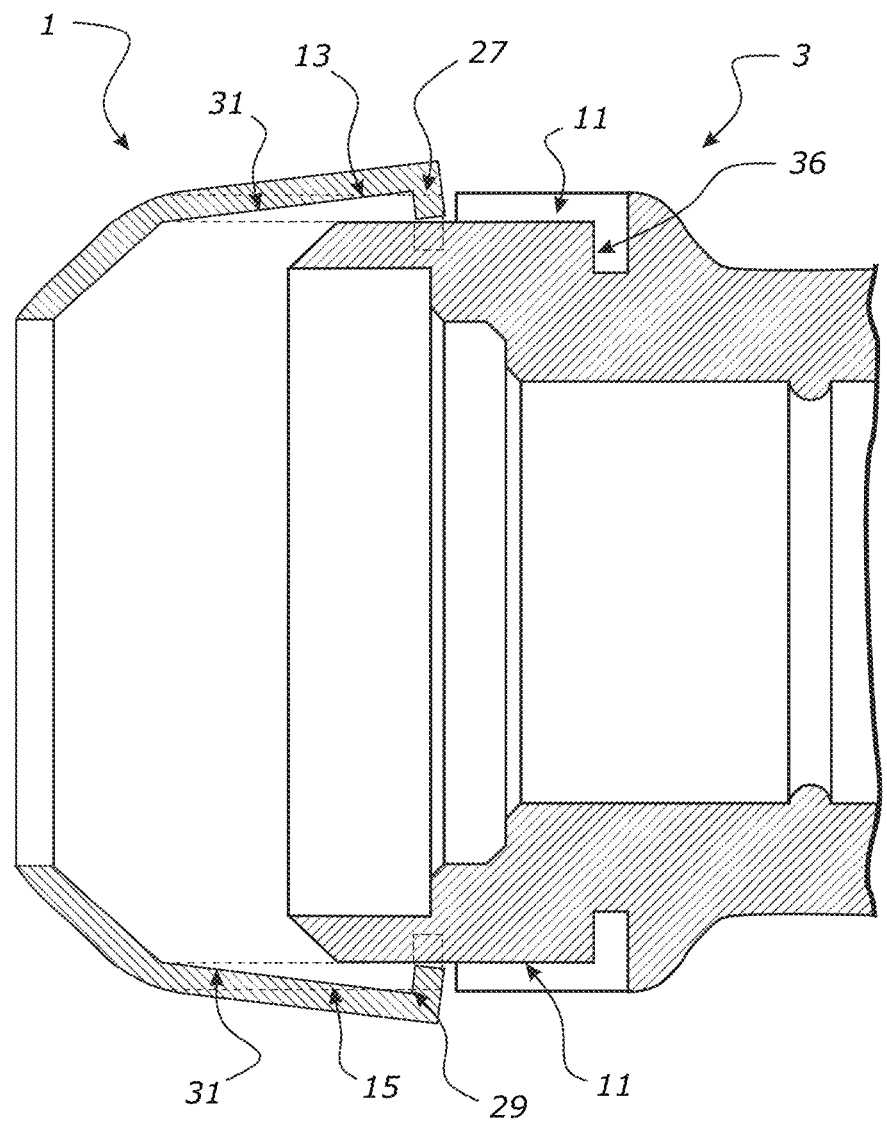
FIG. 6 shows a cross-sectional side view of the plumbing fitting of FIG. 1 in a semi-assembled state.

The spacer members 27, 29 are configured such that, as the fitting end 5 is received by the cap 1, the free end 17, 19 of each of the tabs 13, 15 is displaced radially outwardly from their default circumferential positions shown in FIGS. 1-13. The spacer members 27, 29 are configured as such so as to space apart an inner circumferential surface 31 of the tabs 13, 15 from the outer circumferential surface 11 of the fitting end 5, as the fitting end 5 is received by the cap 1. This provides clearance for travel of the receivers 23, 25 over the respective engagement projections 7, 9, due to the radially outward displacement as shown in FIG. 6.

The plumbing fitting 100 is thereby configured so that the dimensions of the cap 1 and body 3 and their respective features correspond to one another so as to require spacing apart of the inner circumferential surface 31 from the outer circumferential surface 11 to provide clearance for travel of the receivers 23, 25 over the respective engagement projections 7, 9.

Figure 7:
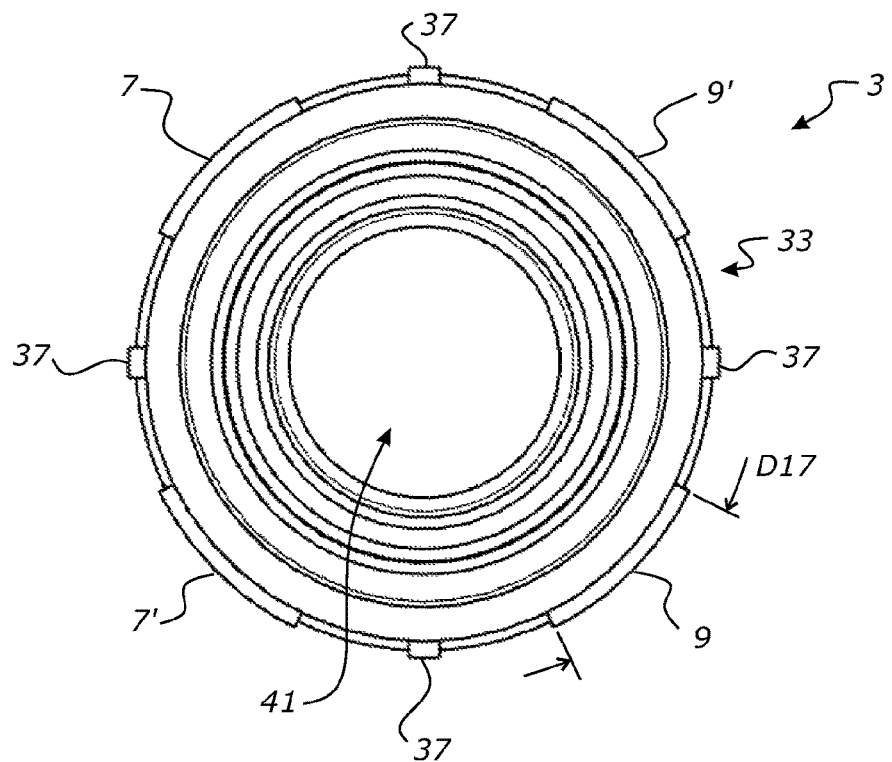
FIG. 7 shows a front view of the body of the plumbing fitting of FIG. 1.
Figure 8:
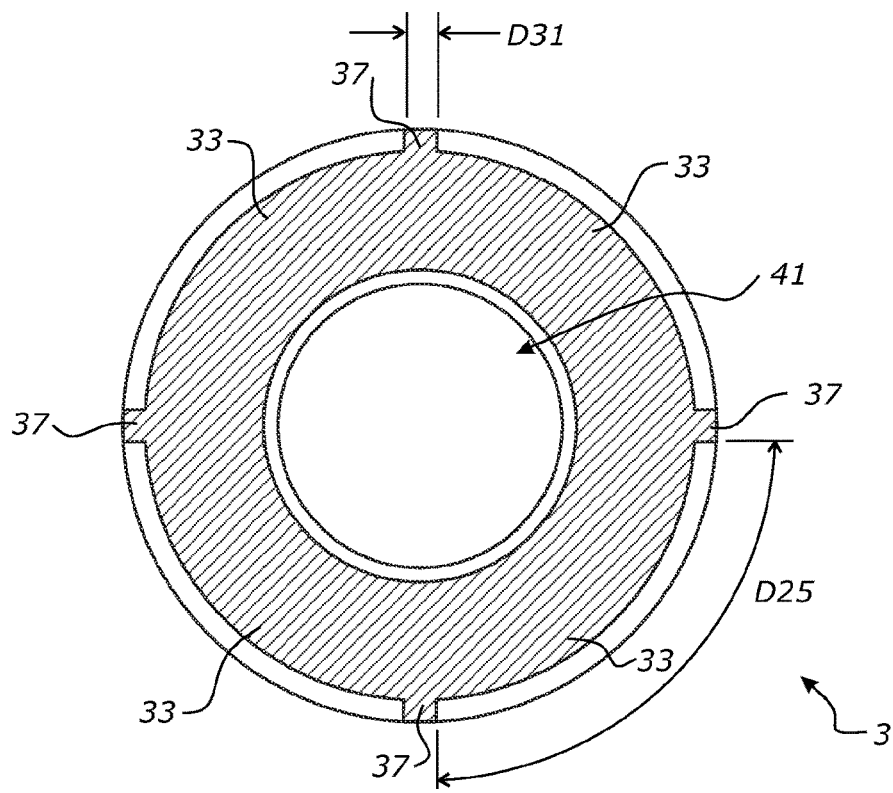
FIG. 8 shows a cross-sectional front view of the body of the plumbing fitting of FIG. 1.
Figure 9:
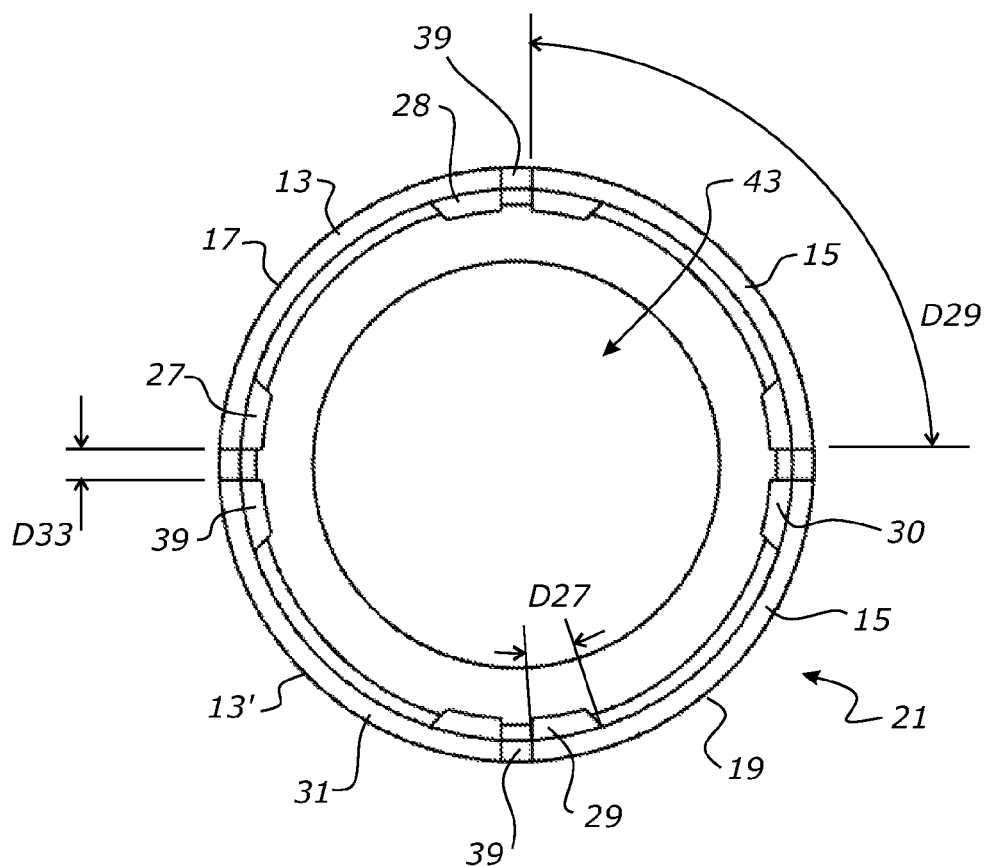
FIG. 9 shows a rear view of the cap of the plumbing fitting of FIG. 1.
Figure 10:
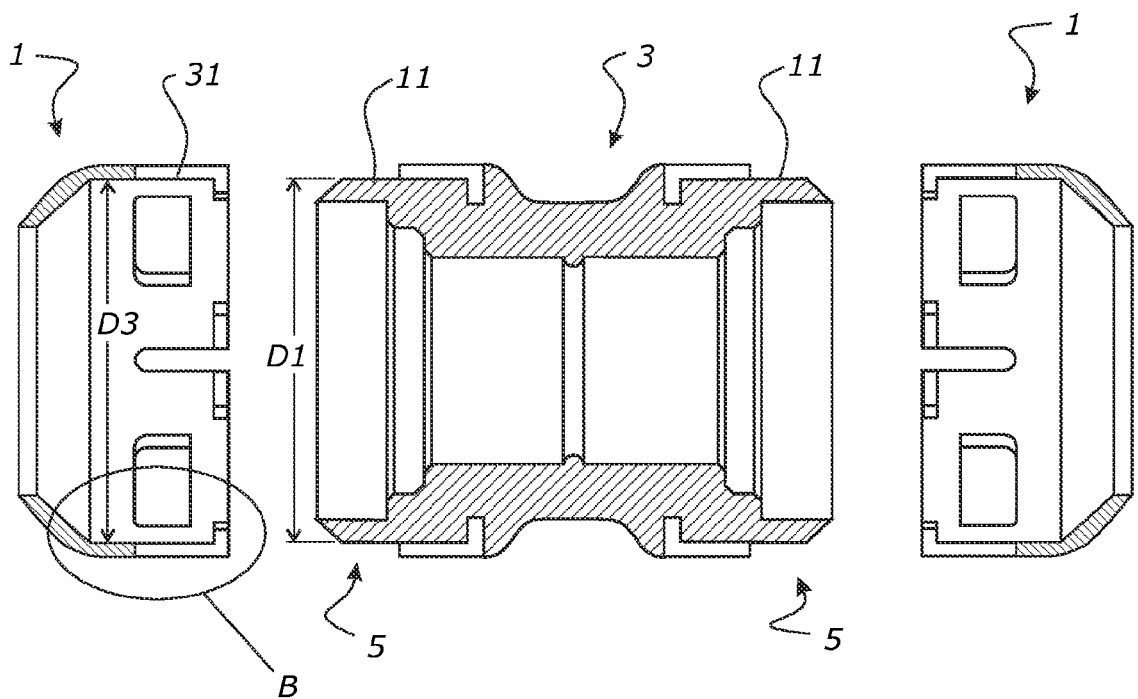
FIG. 10 shows a cross-sectional side view of the plumbing fitting of FIG. 1 in a disassembled state.
Figure 10:
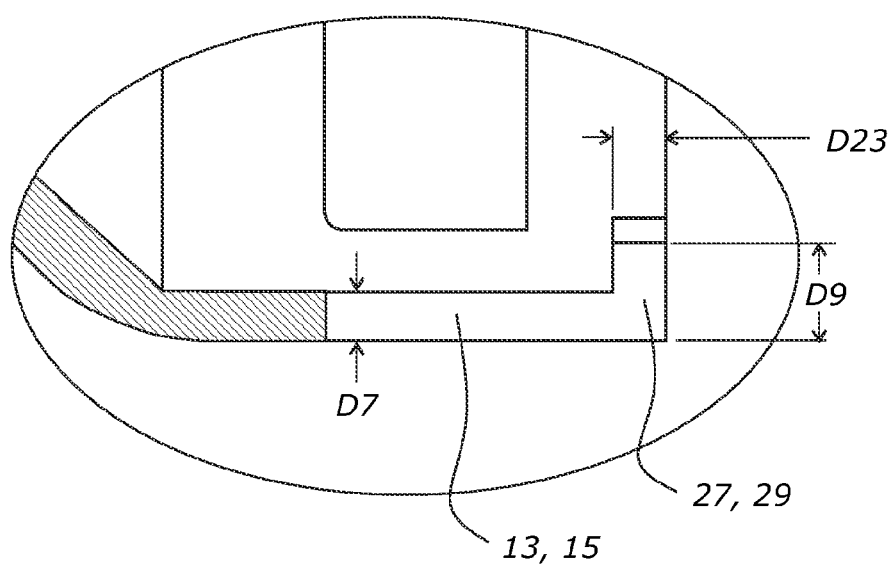
Figure 11:
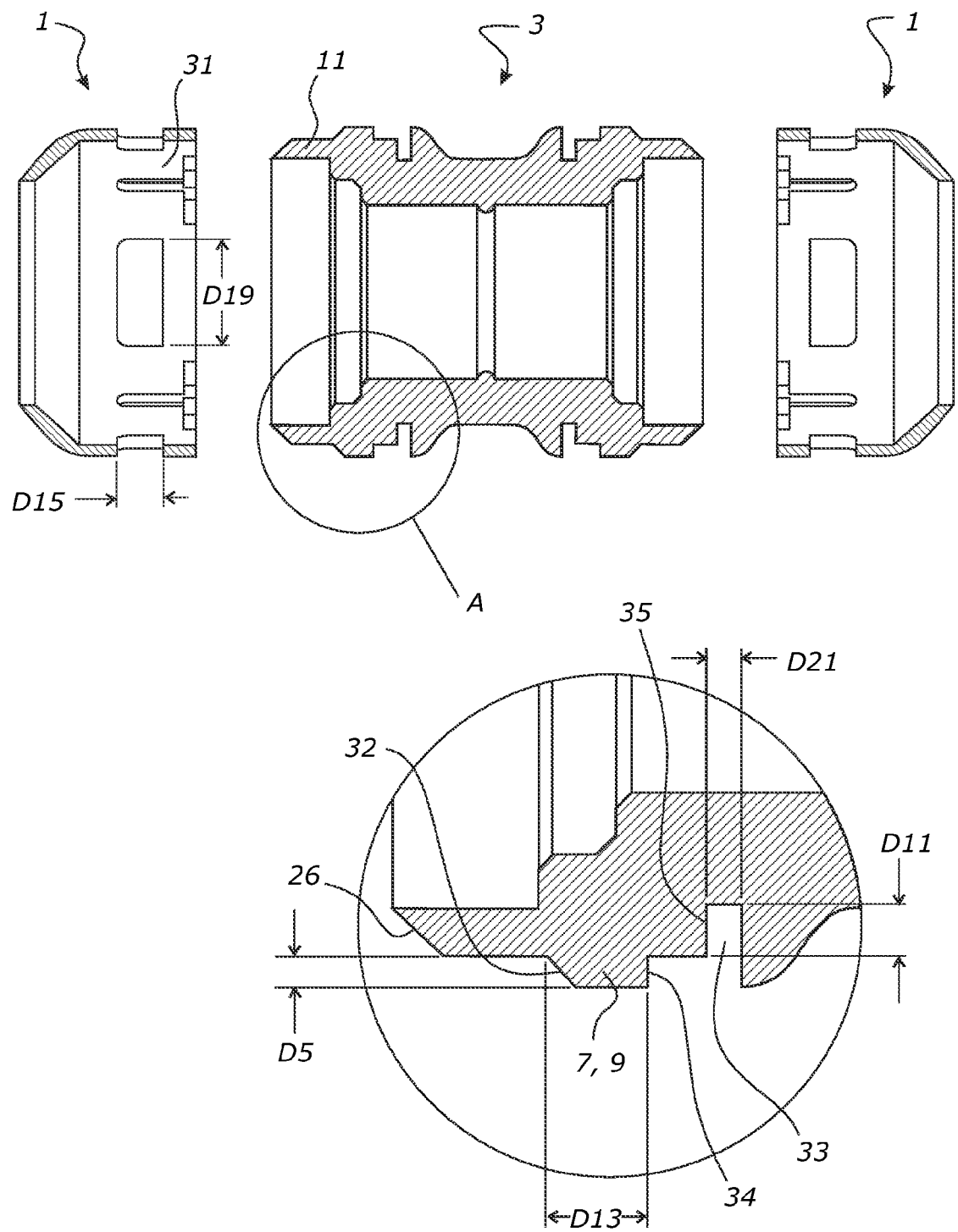
FIG. 11 shows a cross-sectional side view of the plumbing fitting of FIG. 1 in a disassembled state.

This is best illustrated in FIGS. 7-11, where FIGS. 7 and 8 show cross sectional views of the body 3, FIG. 9 shows a rear view of the cap 1, and FIGS. 10 and 11 show cross sectional views of the plumbing fitting 100 in its disassembled state. As can be seen in FIG. 10, the plumbing fitting 100 is dimensioned such that the diameter D1 of the outer circumferential surface 11 of the fitting end 5 is substantially equal to the diameter D3 of the inner circumferential surface 31 of the tabs 13, 15. Thus, receipt of the fitting end 5 by the cap 1 represents a tight-interference fit in which substantial force is required to press the fitting end 5 of the body 3 into the receiving end 21 of the cap 1. Such a fitment typically results in coupling of parts that is predominantly secured through friction between the surfaces of the parts.

Therefore, once the cap 1 receives the fitting end 5, the resulting friction between the outer circumferential surface 11 of the fitting end 5 and the inner circumferential surface 31 of the tabs 13, 15 assists in preventing the cap 1 from being easily removable from the body 3 by simply pulling apart the two along the axial longitudinal direction of the plumbing fitting 100.

In the exemplary embodiment of FIGS. 1-13, the first receiver 23 and second receiver each comprise a receiver aperture extending through the circumferential thickness D7 of the first and second tabs 13, 15 respectively. The circumferential thickness D7 is in a radial direction, so can alternatively be considered a radial thickness.

In that embodiment, the circumferential height D5 of each of the engagement projections 7, 9 (shown in FIG. 11) is dimensioned to be substantially equal to, or greater than, the circumferential thickness D7 of the tabs 13, 15 (shown in FIG. 10). In this way, the tabs 13, 15 require clearance above this height D5 in order for the receivers 23, 25 to receive the projections 7, 9. The circumferential height D5 is in a radial direction, so can alternatively be considered a radial height.

However, in some configurations, the receivers 23, 25 may instead comprise recesses extending radially outwardly from the inner circumferential surface 31 of the tabs 13, 15 into the thickness D7 of the tabs 13, 15, but not through the full circumferential thickness D7. In such an embodiment, the circumferential height D5 of each of the engagement projections 7, 9 will instead by dimensioned to be substantially equal to, but not greater than, the circumferential thickness D7 of the tabs 13, 15.

It should be noted that, in some embodiments, regardless of whether the receivers 23, comprise apertures or recesses, the circumferential height D5 of each of the engagement projections 7, 9 may also be less than the circumferential thickness D7 of the tabs 13, 15.

In any case, the circumferential depth D9 of the spacer members 27, 29 (shown in FIG. 10) is configured to be substantially equal to, or greater than, the circumferential height D5 each of the engagement projections 7, 9, so as to permit sufficient outward radial displacement of the free ends 17, 19 of each of the tabs 13, 15. The circumferential depth D9 is in a radial direction, so can alternatively be considered a radial depth.

This outward radial displacement of the free ends 17, 19 of each of the tabs 13, 15 may also be assisted through provision of an annular chamfer 26 at a periphery of the fitting end 5, shown in FIGS. 3 and 11. The spacer members 27, 29 will undergo a gradual initial outward displacement as they ride over the taper of the annular chamfer 26, helping the free ends 17, 19 of the tabs 13, 15 to move from their default position shown in FIGS. 1-13 to the required outward radial displacement.

This may also be assisted through provision of an engagement projection chamfer 32 at an edge of one or each of the engagement projections 7, 9, shown in FIGS. 3 and 11. The free ends 17, 19 of the tabs 13, 15, already outwardly displaced by the interaction between the spacer members 27, 29 and the outer circumferential surface 11 of the fitting end 5 (and optionally the interaction with the annular chamfer 26) may undergo an additional, final outward displacement as they ride over the taper of the engagement projection chamfer(s) 32.

It should be noted that the substantially rectangular shapes of the engagement projections 7, 9 shown in FIGS. 1-13 are illustrative examples only, and that the engagement projections 7, 9 may take other forms and shapes as long as they fulfil their intended function. For instance, the engagement projections 7, 9 may instead take a wedge-shape that tapers in the direction of the periphery of the fitting end 5, or be outwardly concave or convex in the direction of the periphery of the fitting end 5, regardless of whether or not they are provided with the optional engagement projection chamfer(s) 32. In any case, the engagement projections 7, 9 will typically have an inner ledge 34 that contacts a corresponding internal wall of the respective receiver 23, 25 to substantially inhibit outward longitudinal translation of the cap 1 relative to the body 3 when the cap 1 is coupled thereto.

Therefore, the required radial outward displacement of the free ends 17, 19 of each of the tabs 13, 15 (and thus the subsequent spacing apart of the inner circumferential surface 31 from the outer circumferential surface 11), is achieved predominately through the provision and appropriate configuration of the spacer members 27, 29 but may be further assisted by provision of the annular chamfer 26 or engagement projection chamfer(s) 32.

Once the inner circumferential surface 31 of the tabs 13, 15 is spaced apart from the outer circumferential surface 11 of the fitting end 5, the fitting end 5 may proceed past the receiving end 21 of the cap 1 further into the interior of the cap 1, until the receivers 23, 25 travel over and align with the engagement projections 7, 9.

However, in order for the engagement projections 7, 9 to be received by the receivers 23, 25, the inner circumferential surface 31 of the tabs 13, 15 must return to its default position in contact with the outer circumferential surface 11 of the fitting end 5.

To this end, the fitting end 5 comprises a spacer receiving section configured to receive the spacer members 27, 29 so as to permit the free end 17, 19 of each of the tabs 13, to displace radially inwardly, from their radially outwardly displaced positions, thereby bringing together the inner circumferential surface 31 of the tabs 13, 15 with the outer circumferential surface 11 of the fitting end 5, once the cap 1 is fully inserted onto the fitting end 5.

The spacer receiving section comprises a substantially annular engagement channel 33 shown in FIGS. 2, 3, 8 and 10-12, extending radially inwardly from the outer circumferential surface 31 of the fitting end 5. The substantially annular engagement channel 33 is shown comprising a plurality of discrete annular engagement channels, divided by engagement ridges 37 described in further detail below. In particular, there are four annular engagement channels 33, each corresponding to a respective one of the tabs 13, 13', 15, 15'.

However, in some configurations there may be any number of discrete annular engagement channels corresponding to each, or multiple of, the spacer members 27, 29. Further, in some configurations (without engagement ridges 37, or with engagement ridges 37 that do not extend through the substantially annular engagement channel 33), the annular engagement channel 33 may instead extend continuously and uninterrupted around the entire circumference of the fitting end 5.

Further, in other configurations, the spacer receiving section may instead comprise at least one inward ledge 36 extending radially inwardly from the outer circumferential surface 31 of the fitting end 5. The at least one inward ledge may for example take a form similar to that of the internal wall 35 of the annular engagement channel 33. If multiple inward ledges are provided, each may correspond to each, or multiple of, the spacer members 27, 29. However in some configurations, the inward ledge may instead extend continuously around the entire circumference of the fitting end 5.

In any case, the spacer receiver section is dimensioned so as to correspond to the circumferential depth D9 of the spacer members 27, 29. This is shown in FIGS. 10 and 11, wherein the circumferential depth D11 of the substantially annular engagement channel 33 (shown in FIG. 11) is equal to, or greater than, the circumferential depth D9 (shown in FIG. 10) of the spacer members 27, 29.

This allows the entirety of the spacer members 27, 29 to be received by the substantially annular engagement channel 33, thereby allowing the inner circumferential surface 31 of the tabs 13, 15 to return to contact the outer circumferential surface 31 of the fitting end 5. Consequently, the entirety of the engagement projections 7, 9 are received by the receivers 23, 25.

Figure 12:
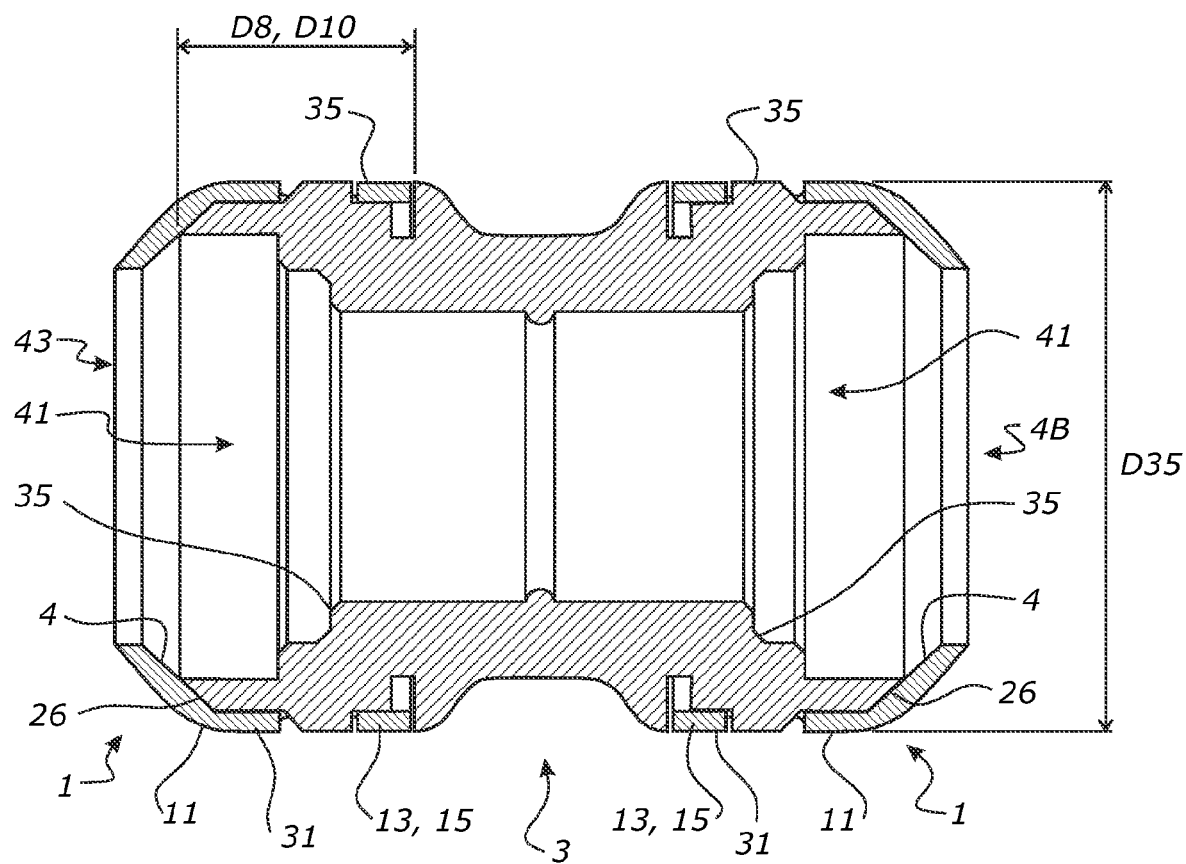
FIG. 12 shows a cross-sectional side view of the plumbing fitting of FIG. 1 in an assembled state.

The spacer receiver section, whether comprising the substantially annular engagement channel 33, at least one inward ledge, or combinations/configurations thereof as outlined above, may define an edge or periphery of the fitting end 5. In this way, the length D8 of the cap 1 corresponds to the length D10 of the fitting end 5, as shown in FIG. 12. This, together with appropriate configuration of dimensions D1, D3, D9, D11 substantially constrains the fitting end 5 within the interior of the cap 1.

When the fitting end 5 is fully received by the cap 1, there is substantially no free space between the inner circumferential surface 31 and the outer circumferential surface 11, between the periphery of the fitting end 5 (whether it includes the optional annular channel 26) and an interior chamfer 4 of the cap 1, and between spacer members 27, 29 and the (internal wall 35 of the) substantially annular engagement channel 33 (or the at least one inward ledge), as shown in FIG. 12.

Thus, when the fitting end 5 is fully received by the cap 1, appropriate configurations of dimensions D8 and D10 as well as other dimensions D1, D3, D9, D11 helps to substantially inhibit movement of the cap 1 relative to the body 3 due to friction between these contacting surfaces/features, thereby helping to prevent removal of the cap 1 from the body 3.

However, the main features of the plumbing fitting 100 responsible for preventing removal of the cap 1 from the body 3 once coupled together are the engagement projections 7, 9 together with the receivers 23, 25, and the spacer members 27, 29 together with the spacer receiving section.

Receipt of the engagement projections 7, 9 by the receivers 23, 25 together with receipt of the spacer members 27, 29 by the spacer receiving section (comprising the substantially annular engagement channel 33) together provide a substantially non-releasable coupling of the cap 1 to the body 3.

Therefore, a user attempting to pull apart the cap 1 from the body 3 through application of force along an axial longitudinal direction is prevented from doing so thanks to the engagement projections 7, 9 and the spacer members 27, 29 concurrently pressing against respective enclosing surfaces, of the receivers 23, 25 and the substantially annular engagement channel 33, that constrain the engagement projections 7, 9 and the spacer members 27, 29 therein.

As such, the receivers 23, 25 and the substantially annular engagement channel 33 are dimensioned appropriately with respect to the engagement projections 7, 9 and the spacer members 27, 29 to constrain and enclose them in a way that substantially inhibits movement of the cap 1 relative to the body 3, once the fitting end 5 is received by the cap 1.

For instance, the length D13 (shown in FIG. 11) of the engagement projections 7, 9 is substantially equal to the length D15 (shown in FIG. 11) of the receivers 23, 25. In this way, once the engagement projections 7, 9 are received by the receivers 23, 25, the cap 1 is substantially inhibited from translation in the longitudinal direction, as both longitudinal ends of the engagement projections 7, 9 are constrained by respective longitudinal internal walls of the receivers 23, 25.

In some configurations, such as the exemplary embodiment of FIGS. 1-13, the width D17 (shown in FIG. 7) of the engagement projections 7, 9 may also be substantially equal to the width D19 (shown in FIG. 11) of the receivers 23, 25. In this way, once the engagement projections 7, 9 are received by the receivers 23, 25, the cap 1 is substantially inhibited from rotation about the longitudinal direction, as both lateral ends of the engagement projections 7, 9 are constrained by respective lateral internal walls of the receivers 23, 25.

Therefore, each receiver 23, 25 and respective engagement projection 7, 9 are together configured to substantially inhibit longitudinal translation and/or axial rotation of the cap 1 relative to the body 3 when the receiver 23, 25 receives the respective engagement projection 7, 9.

Further, the width D21 (shown in FIG. 11) of the substantially annular engagement channel 33 is substantially equal to the width D23 (shown in FIG. 10) of the spacer members 27, 29. In this way, once the spacer members 27, 29 are received by the substantially annular engagement channel 33, the cap 1 is substantially inhibited from translation in the longitudinal direction, as both longitudinal ends of the spacer members 27, 29 are constrained by respective longitudinal internal walls (including the internal wall 35) of the substantially annular engagement channel 33.

Further, in some configurations, when one spacer member is provided on a tab, the circumferential length D25 (shown in FIG. 8) of a given discrete channel of the substantially annular engagement channel 33 may correspond to the circumferential length D27 (shown in FIG. 9) of that spacer member. In that way, both sides of that spacer member are enclosed and constrained by respective lateral internal walls of that discrete channel of the substantially annular engagement channel 33.

However, if two or more spacer members are arranged on a tab, such as in the embodiment of FIGS. 1-13, the circumferential length D25 of a given discrete channel of the substantially annular engagement channel 33 may instead correspond to the circumferential length D29 (shown in FIG. 9) between the positions of the two outermost spacer members of that tab (spacer members 27, 28 for first tab 13, or spacer members 29, 30 of second tab 15). In this way, once the spacer members are received by the annular engagement channel 33, the cap 1 is substantially inhibited from rotation about the longitudinal direction, as the outermost lateral end of the outermost spacer members is constrained by respective lateral internal walls of that given discrete channel of the substantially annular engagement channel 33.

Therefore, the spacer receiving section and the spacer members 27, 29 are together configured to substantially inhibit longitudinal translation and/or axial rotation of the cap 1 relative to the body 3 when the spacer members are received by the spacer receiving section.

For instance, in the exemplary embodiment of FIGS. 1-13, the circumferential length D25 of a given discrete channel of the substantially annular engagement channel 33 is not equal to the circumferential lengths D27 of the spacer members 27, 29. However, the circumferential lengths D25 are nonetheless configured to correspond to the circumferential length D29 between the positions of the two outermost spacer members 27, 28 of the first tab 13 and outermost spacer member 29, 30 of the second tab. In the exemplary embodiment of FIGS. 1-13, this circumferential length D29 also corresponds to and/or is defined by the provision of the engagement ridges 37 described below.

In this way, since this particular embodiment of the plumbing fitting 100 comprises two spacer members at lateral ends of each tab, the outermost lateral wall of the outermost spacer members of each tab contacts a respective lateral wall of each engagement ridge 37, so as to substantially inhibit rotation about the longitudinal direction of the cap 1 relative to the body 3. In some embodiments, where engagement ridges 37 are not provided, or where engagement ridges 37 do not extend through the substantially annular engagement channel 33, the substantially annular engagement channel 33 may nonetheless possess inward lateral walls that constrain the spacer members of a given tab in the same manner as the engagement ridges 37.

As can be seen in FIGS. 1-13, the body 3 comprises at least one engagement ridge 37 extending longitudinally along and radially outwardly from the outer circumferential surface 11 of the fitting end 5 and configured to engage between adjacent tabs. In the exemplary embodiment of FIGS. 1-13, the at least one engagement ridge 37 is configured to engage in a slot 39 between the adjacent tabs.

In the 'four-tab' embodiment of FIGS. 1-13, a slot 39 is provided on both lateral ends of the first tab 13: between the first tab 13 and the third tab 13' and between the first tab 13 and the fourth tab 15'; as well as on both lateral ends of the second tab 15, between the second tab 16 and the third tab 13' and between the second tab 16 and fourth tab 15'. However, in a 'two-tab' embodiment having only a first and second tab 13, 15, a slot 39 may be provided on both lateral ends of the first tab 13 and the second tab 15, between those two adjacent tabs.

In any case, regardless of whether the cap 1 comprises two to eight or more tabs, the at least one engagement ridge 37 is configured to engage between any two adjacent tabs (or a slot between any two adjacent tabs).

Further, in some configurations, the at least one engagement ridge 37 may engage with a discontinuous space between adjacent tabs, such as the slot 39, an internal recess between adjacent tabs (or the like), or a deformable section between adjacent tabs. The deformable section may comprise a portion of material that is more flexible than the material from which the tabs are formed, or may comprise a portion of material defining or enclosing the recess, made of the same or a more flexible material than the material from which the tabs are formed. Further, in some configurations, the cap 1 may comprise a combination of slots, recesses or deformable sections or combinations/modifications thereof between adjacent tabs.

It should also be noted that regardless of the number of tabs, the circumferential lengths of the tabs, and their circumferential positions, can be configured so that the at least one engagement ridge 37 engages in a slot/recess/deformable section/or combinations/modifications thereof having any given circumferential length or thickness.

For instance, in a 'two-tab' embodiment, the first and second tabs 13, 15 may have the same circumferential lengths and positions as the first and second tabs 13, 15 shown in the 'four-tab' embodiment of FIGS. 1-13, with spaces between the first and second tabs 13, 15 where the third and fourth tabs 13', 15' are shown; therefore, the at least one engagement ridge 37 would engage between the first and second tabs 13, 15 in either of those spaces (having similar circumferential lengths as the third and fourth tabs 13', 15'), and those spaces may comprise a slot/recess/deformable section/or combinations/modifications thereof. However, in preferred embodiments, the circumferential lengths of the tabs are configured so as to extend substantially around the circumference of the cap 1, in a similar manner to the 'four-tab' embodiment of FIGS. 1-13.

In any case, flexure of adjacent tabs relative to the other is permitted. In this way, regardless of whether a slot, a recess, a deformable section, or combinations/modifications thereof is provided between adjacent tabs, each tab is able to move, flex, or deform relative to one another and relative to the substantially rigid cone end 2 of the cap 1. In particular, the slot/recess/deformable section/or combinations/modifications thereof between adjacent tabs should extend from the receiving end 21 of the cap 1 into a substantial length of the cap 1, so as to permit enough flexibility for the free ends 17, 19 of the tabs to displace radially inwardly or outwardly relative to their default circumferential positions shown in FIGS. 1-13. The length of the slot/recess/deformable section/or combinations/modifications thereof between adjacent tabs thereby substantially defines the length of each tab.

In the exemplary embodiments of FIGS. 1-13, there are four engagement ridges 37 that correspond to four slots 39. The slots 39, and the at least one engagement ridge 27 are dimensioned respectively so as to provide constrained enclosure of the engagement ridges 27 by the slots 39.

For instance, the circumferential thickness D31 (shown in FIG. 8) of the at least one engagement ridge 27 is substantially equal to the circumferential thickness D33 (shown in FIG. 9) of the slot 39 between the adjacent tabs. In this way once the at least one engagement ridge 27 is received by the slot 39 between the adjacent tabs, the cap 1 is substantially inhibited from rotation about the longitudinal direction, as one of, or both lateral sides of at least one engagement ridge 27 is constrained by respective internal lateral walls of the slot 39 between the adjacent tabs.

Therefore, the at least one engagement ridge 27 is configured to substantially inhibit axial rotation of the cap 1 relative to the body 3 when the at least one engagement ridge 27 is engaged between the adjacent tabs (or engaged in a slot 39 between adjacent tabs).

In addition to the configuration of dimensions D1-D33, the positions of the various features of the cap 1 and body 3 correspond to one another so as to provide a coupling that may be easily and quickly aligned.

For instance, since the receivers 23, 25 are configured to receive the engagement projections 7, 9, the positions of the receivers 23, 25 appropriately correspond to the positions of the engagement projections 7, 9. Likewise, since the slots 29 are configured to receive the at least one engagement ridge 37, the positions of the engagement ridges 37 appropriately correspond to the positions of the slots 29. Finally, since the spacer receiver section comprising the substantially annular engagement channel 33 is configured to receive the spacer members 27, 28, 29, 30, the positions of the discrete engagement channels 33 appropriately correspond to the positions of the spacer members 27, 28, 29, 30.

As a result, because the positions of the receivers 23, 25 correspond to the positions of the engagement projections 7, 9, the spacer members 27, 28, 29, 30 are circumferentially offset from the first and second receivers 23, 25. This ensures that the spacer members 27, 28, 29, 30 do not contact or abut against the engagement projections 7, 9 during receipt of the fitting end 5 by the cap 1.

It should be noted that, as described above, each tab need only comprise one spacer member, however if two or more spacer members are provided on a given tab, they must be arranged so as to be circumferentially offset from the receiver of that tab for the same reason.

Further, since the positions of the engagement ridges 37 correspond to the positions of the slots 29, the slot 29 is circumferentially offset from the first and second receivers 23, 25. This ensures that the engagement ridges 37 do not contact the first and second receivers 23, 25 during receipt of the fitting end 5 by the cap 1.

Finally, the first and second engagement projections 7, 9, as well as the third and fourth (or fifth, sixth, seventh etc.) engagement projections are all circumferentially spaced apart from one another.

Thus, the various features of the cap 1 and body 3 are shown correspondingly arranged about the circumferences of the cap 1 and body 3 to respectively interface with one another. Further, since the various features of the cap 1 are arranged on, or correspond to a given tab, the cap 1 can be axially rotated to align any one given tab having its various features, with any one given engagement projection and the features of the fitting end 5 proximal that engagement projection.

This results in tabs that are configured in a circumferentially symmetric manner. For instance, for the exemplary embodiment of FIGS. 1-13, a user may easily rotate either the cap 1 or the body 3 about 90 degrees to align any one given tab of the cap 1 having its various features with any one given engagement projection of the body 3, to thereby and quickly and easily couple them together. This applies equally to configurations of the plumbing fitting 100 wherein the cap 1 instead comprises an odd number of tabs, for instance a cap 1 having three tabs and therefore instead requiring about 120 degree rotations to align features of the cap 1 with the fitting end 5 of the body 3.

Therefore, the plumbing fitting 100, through provision of engagement projections 7, 9, receivers 23, 25, spacer members 27, 29, spacer receiver sections (substantially annular engagement channel 33) and optionally, engagement ridges 37 and slots 29 between each tab, provides a substantially non-releasable coupling of the cap 1 to the body 3. This in turn, prevents the plumbing fitting 100 from being easily disassembled, damaged or tampered with, providing security for the plumbing lines connected thereto, as well as features of the plumbing assembly 200 (described in further detail below) enclosed by the plumbing fitting 100.

Further, the cap 1 and its various features, are preferably integrally formed from a uniform material, as is the body 3 and its various features. Therefore, the plumbing fitting 100 provides such a substantially non-releasable and tamper-proof coupling, without the need for complex assemblies with many moving parts.

Preferably, the material comprises a deformable material such as moulded plastic or the like. Alternatively, the material may comprise aluminium, aluminium alloy(s), brass, brass alloy(s), steel, stainless steel, steel alloy(s), or any other suitable metal or metal alloy(s). In this way, when the spacer members 27, 29 are displaced radially outwardly during receipt of the fitting end 5 by the cap 1, then subsequently received by the spacer receiving section, the free ends 17, 19 of the tabs 13, 15 return to their default positions of FIGS. 1-13 so that the tabs 13, 15 are only temporarily or elastically deformed during receipt of the fitting end 5 by the cap 1.

Therefore, the provision of the features described above mean that the cap 1 is deformed elastically for a minimal period of time during use of the plumbing fitting 100. As a result, after coupling of the cap 1 to the body 3, the tabs 13, 15 of the cap 1 substantially maintain their original integrity, rather than permanently or inelastically deforming the tabs 13, 15 and therefore weakening the coupling of the cap 1 to the body 3.

It should be noted that many of the shapes or forms shown of the various features of the cap 1 and body 3 (such as the engagement projections 7, 9, receivers 23, 25, annular chamfer 26, spacer members 27, 29, engagement projection chamfer 32, substantially annular engagement channel 33, engagement ridges 37 and/or slots 29) are illustrative examples only and may take other forms and shapes as long as they fulfil their intended function.

For instance, the engagement projections 7, 9 and corresponding receivers 23, 25 are shown having substantially rectangular shapes, however they may instead take wedge-shape, concave shape or convex shape as outlined above, for example, as long as that shape still comprises the dimensions D13, D15, D17, D19 of the engagement projections 7, 9 and corresponding receivers 23, 25 described above, as well as features such as the inner ledge 34 of the engagement projections 7, 9 cooperating with internal walls of the receivers 23, 25, that causes engagement between the two to substantially inhibit longitudinal translation and/or axial rotation of the cap 1 relative to the body 3 when the receiver 23, 25 receives the respective engagement projection 7, 9.

FIG. 13 shows an exploded view of an embodiment of the plumbing fitting 100 in use. This embodiment of the plumbing fitting 100 may have any one or more of features, functionality, and described for the embodiment of the plumbing fitting of FIGS. 1-12. As shown, when the body 3 comprises two fitting ends 5 on opposing ends of the body 3, the plumbing fitting 100 can be used to connect a plumbing line 301 to another plumbing line 401. However, in some instances as outlined above, the body 3 may instead comprise only one fitting end 5, with the other end of the body 3 forming part of a plumbing component such as a valve, or integrally formed with a wall or other structural feature through which a plumbing line 301 fitted to the plumbing fitting 100 passes.

In any case, the body 3 comprises a bore 41 extending from the fitting end 5 and longitudinally through the body 3. This bore 41 is configured to receive a plumbing assembly 200. The cap 1 comprises a plumbing aperture 43 configured to receive a plumbing line 301 couplable to the plumbing assembly 200. The plumbing assembly 200 is shown in its expanded state in FIG. 13 and comprises an O-ring 201, an insert 203 and a grab-edge member 205.

In use, the plumbing assembly 200 is first arranged within the bore 41 of the body 3, then the plumbing line 301 run through the plumbing aperture 43 of the cap 1. The open end 303 of the plumbing line 301 is passed through the grab-edge member 205 and the 201 to press around and receive the cylindrical body of the insert 203, before the cap 1 is pushed onto the fitting end 5 of the body 3 so as to substantially non-releasably couple the cap 1 to the body 3, and therefore enclose the plumbing assembly 200 and the open end 303 of the plumbing line 301 within the plumbing fitting 100.

This substantially non-releasable coupling of the cap 1 to the body 3, as outlined above, therefore prevents disassembly of the plumbing fitting 100 so as to protect the plumbing fitting 100, and the plumbing assembly 200 and open end 303 of the plumbing line 301 enclosed therein, from tampering theft or damage. Further, the substantially no free space between the various features of the plumbing fitting 100 when connected, and in particular the flexible or deformable features such as the tabs 13, 15 of the cap 1, as described above, make it difficult to deform, pull-apart or displace those flexible features so as to forcibly remove the cap 1 from the body 3. This prevents the particular plumbing application the plumbing fitting 100 is used in from becoming destabilised or damaged due to a change in, for example pressure, temperature or flow rate, that may be caused by tampering, theft or damage of the fitting 100, and the plumbing assembly 200 and open end 303 of the plumbing line 301 enclosed therein.

It should be noted that the plumbing assembly 200 shown in FIG. 13 is only an illustrative example of a plumbing assembly 200. The plumbing assembly 200 make take other suitable forms depending on, for instance, the material of the plumbing line 301, the make-up of the fluid passing therethrough and/or the particular application in which the pluming fitting 100 is used. For instance, the plumbing assembly 200 may comprise more than one O-ring, an insert comprised of multiple moving parts such as a retainer or collet, or other features that those skilled in the art may contemplate when adapting the plumbing fitting 100 for a given application.

In any case, the plumbing assembly 200 shown in FIG. 13 comprising the grab-edge member 205 allows one to disconnect the plumbing line 301 from the plumbing fitting 100 without requiring disassembly of the plumbing fitting 100 itself. This may be achieved by simply pushing the edge of the grab-edge member 205 that protrudes from the plumbing aperture 43 further into the interior of the plumbing fitting 100 while simultaneously pulling and twisting the plumbing 301 line out from the interior of the plumbing fitting 100, causing the grab-edge member 205 to release the open end 303 of the pluming line 301 from the insert 203 and thus allowing the plumbing line 301 to be pulled out from the plumbing aperture 43 of the cap 1.

Other components that the grab-edge member 205 may be contemplated by those skilled in the art that may provide a similar function, or alternatively, may not allow the plumbing line 301 from being disconnected once the cap 1 is coupled to the body 3.

It should also be noted that while the body 3 shown in FIGS. 1-13 comprises two opposing ends with two fitting ends 5, it may instead comprise a tee-junction having three ends, or a four-way junction having four ends, for example. In any case, the bore 41 may extend from one end to the other, or in the case of a body 3 having more than two ends, may extend to a junction between other bores of other ends. The body 3 therefore provides fluid communication between the plumbing line(s) connected thereto.

Further, each of these other ends may comprise a fitting end configured in substantially the same manner as the fitting end 5 described throughout this specification, and therefore be configured to be received by a cap configured in substantially the same manner as the cap 1 described throughout this specification. In this way, the body 3 may be configured to provide connection between a plurality of plumbing lines, with each connection being substantially non-releasable and thereby protected from tamper, damage and/or theft.

In one exemplary embodiment, the plumbing fitting 100 is configured such that the largest maximum diameter D35 of the plumbing fitting 100, as shown in FIG. 12, is about 30 mm. This largest maximum diameter D35 corresponds to the external diameter of the cap 1 as well as the body 3, in the configuration shown in which they are substantially equal. The other dimensions D1-D33 in this exemplary embodiment have the following values: D1 28.6 mm, D3 28.6 mm, D5 1.1 mm, D7 1.1 mm, D8 10.9 mm, D10 11.8 mm, D9 1.1 mm, D11 2.0 mm, D13 3.8 mm, D15 4.3 mm, D17 9.4 mm, D19 10 mm, D21 1.3 mm, D23 1.1 mm, D25 19.1 mm, D29 18.6 mm, D27 3 mm, D31 1.6 mm, D33 1.6 mm.

As such, numerical differences between the above pairs of dimensions that are described above as 'corresponding' or 'substantially equal' provides examples of the tolerances appropriate for this exemplary embodiment. For example, the circumferential depth D11 of the substantially annular engagement channel 33 is described above as equal to, or greater than, the circumferential depth D9 of the spacer members 27, 29. This can be seen listed above, where D9 is 1.1 mm and D11 is 2.0 mm.

Further, dimensions D8 and D10, D13 and D15, D17 and D19, D21 and D23, D25 and D29, are all described above as 'substantially equal', and as listed for the exemplary embodiment above, may have less than 1.0 mm of difference between each corresponding pair. By contrast, dimensions D1 and D3, D5 and D7, D31 and D33 have exact matching values. Differences between dimensions described as 'corresponding' or 'substantially equal' may be smaller or larger than those listed above.

In other embodiments of the plumbing fitting 100, the largest maximum diameter D35 may range from about 10 mm to about 110 mm, or larger, with the other dimensions D1-D33 scaling up or down in proportion with D35.

A skilled person will understand that these dimensions are exemplary only, and the dimensions of the plumbing fitting and its features can be varied without departing from the scope of the invention.

Preferred embodiments of the invention have been described by way of example only and modifications may be made thereto without departing from the scope of the invention.

The invention claimed is:

1. A plumbing fitting comprising:
   a cap; and
   a body comprising a fitting end that is configured to be received by the cap, the body comprising a first engagement projection and a second engagement projection that are circumferentially spaced apart from each other and that extend radially outwardly from an outer circumferential surface of the fitting end;
   wherein the cap comprises:
      a first tab and a second tab, each tab having a free end at a receiving end of the cap;
      the first tab comprising a first recess that is configured to receive the first engagement projection and the second tab comprising a second recess that is configured to receive the second engagement projection, the first and second recesses each extending through a substantial portion of a radial thickness of the first and second tabs, respectively;
      wherein the tabs are configured to permit flexure of each tab relative to the other; and
      wherein each tab comprises a radially inwardly extending spacer member at the free end of the tab;
   wherein, as the fitting end is received by the cap, the free end of each of the tabs is displaced radially outwardly so as to space apart an inner circumferential surface of the tabs from the outer circumferential surface of the fitting end, thereby providing clearance for receipt of the engagement projections by the first and second recesses.

2. The plumbing fitting of claim 1, wherein the fitting end comprises a spacer receiving section configured to receive the spacer members so as to permit the free end of each of the tabs to displace radially inwardly thereby bringing together the inner circumferential surface of the tabs with the outer circumferential surface of the fitting end.

3. The plumbing fitting of claim 2, wherein receipt of the engagement projections by the recesses together with receipt of the spacer members by the spacer receiving section together provide a substantially non-releasable coupling of the cap to the body.

4. The plumbing fitting of claim 3, wherein the spacer receiving section comprises at least one inward ledge extending radially inwardly from the outer circumferential surface of the fitting end.

5. The plumbing fitting of claim 3, wherein the spacer receiving section comprises a substantially annular engagement channel extending radially inwardly from the outer circumferential surface of the fitting end.

6. The plumbing fitting of claim 2, wherein the spacer receiving section and the spacer members are together configured to substantially inhibit longitudinal translation and/or axial rotation of the cap relative to the body when the spacer members are received by the spacer receiving section.

7. The plumbing fitting of claim 1, wherein each recess and respective engagement projection are together configured to substantially inhibit longitudinal translation and/or axial rotation of the cap relative to the body when the recess receives the respective engagement projection.

8. The plumbing fitting of claim 1, wherein the body comprises at least one engagement ridge extending longitudinally along and radially outwardly from the outer circumferential surface of the fitting end and configured to engage between adjacent tabs.

9. The plumbing fitting of claim 8, wherein the at least one engagement ridge is configured to substantially inhibit axial rotation of the cap relative to the body when the at least one engagement ridge is engaged between the adjacent tabs.

10. The plumbing fitting of claim 8, wherein the at least one engagement ridge non-rotatably engages in a slot between the adjacent tabs.

11. The plumbing fitting of claim 10, wherein the slot is circumferentially offset from the first and second recesses.

12. The plumbing fitting of claim 1, wherein the first recess and second recess each comprise an aperture extending through an entirety of the radial thickness of the first and second tabs, respectively.

13. The plumbing fitting of claim 1, wherein the spacer members are circumferentially offset from the first and second recesses.

14. The plumbing fitting of claim 1, wherein the body comprises:
a third engagement projection and a fourth engagement projection circumferentially spaced apart from the first and second engagement projections and extending radially outwardly from the outer circumferential surface of the fitting end;
and wherein the cap comprises:
a third tab and a fourth tab each having a free end at the receiving end of the cap;
the third tab comprising a third recess that is configured to receive the third engagement projection and the fourth tab comprising a fourth recess that is configured to receive the fourth engagement projection;
wherein the third tab and the fourth tab each comprise a radially inwardly extending spacer member at the free end of the third tab and fourth tab respectively.

15. The plumbing fitting of claim 1, wherein the body comprises a bore extending from the fitting end and longitudinally through the body and configured to receive a plumbing assembly and wherein the cap comprises a plumbing aperture configured to receive a plumbing line couplable to the plumbing assembly.

16. The plumbing fitting of claim 15, wherein the fitting end comprises a spacer receiving section configured to receive the spacer members so as to permit the free end of each of the tabs to displace radially inwardly thereby bringing together the inner circumferential surface of the tabs with the outer circumferential surface of the fitting end, and wherein receipt of the engagement projections by the recesses together with receipt of the spacer members by the spacer receiving section together provide a substantially non-releasable coupling of the cap to the body, and wherein receipt of the plumbing line by the plumbing aperture, coupling of the plumbing line to the plumbing assembly, receipt of the plumbing assembly by the bore and coupling of the cap to the body together provide a substantially fluidly-sealed connection of the plumbing line to the plumbing fitting.

17. The plumbing fitting of claim 1, wherein the first recess is spaced from the free end of the first tab and a wall portion of the first tab is positioned between the first recess and the free end of the first tab, wherein the second recess is spaced from the free end of the second tab and a wall portion of the second tab is positioned between the second recess and the free end of the second tab, and wherein the first engagement projection and the second engagement projection are spaced from a free end of the fitting end that is received in the cap when the fitting end is received in the cap.

18. The plumbing fitting of claim 1, wherein each recess and respective engagement projection together inhibit longitudinal translation and axial rotation of the cap relative to the body when each recess receives the respective engagement projection.

* * * * *